United States Patent
Ueda et al.

(10) Patent No.: US 10,775,232 B2
(45) Date of Patent: Sep. 15, 2020

(54) ENVIRONMENTAL SENSOR

(71) Applicant: OMRON Corporation, Kyoto-shi, Kyoto (JP)

(72) Inventors: Naotsugu Ueda, Kusatsu (JP); Kayo Nakamura, Kusatsu (JP); Ryusuke Sakai, Kyoto (JP); Takanobu Yamauchi, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 185 days.

(21) Appl. No.: 15/868,130

(22) Filed: Jan. 11, 2018

(65) Prior Publication Data
US 2018/0259386 A1    Sep. 13, 2018

(30) Foreign Application Priority Data
Mar. 13, 2017    (JP) .................. 2017-047854

(51) Int. Cl.
| | |
|---|---|
| G06F 21/32 | (2013.01) |
| G01J 1/02 | (2006.01) |
| G05B 15/02 | (2006.01) |
| G06F 3/01 | (2006.01) |
| G01D 21/02 | (2006.01) |
| G08B 21/18 | (2006.01) |

(52) U.S. Cl.
CPC ............... G01J 1/02 (2013.01); G01D 21/02 (2013.01); G05B 15/02 (2013.01); G06F 3/017 (2013.01); G06F 21/32 (2013.01); G08B 21/182 (2013.01)

(58) Field of Classification Search
CPC ..................................................... G06F 21/88
See application file for complete search history.

(56) References Cited

U.S. PATENT DOCUMENTS

| | | |
|---|---|---|
| 2009/0203355 A1 | 8/2009 | Clark |
| 2009/0300525 A1 | 12/2009 | Jolliff et al. |
| 2014/0089243 A1* | 3/2014 | Oppenheimer ......... G06F 21/50 706/46 |
| 2016/0125879 A1 | 5/2016 | Lovitt |
| 2016/0203362 A1 | 7/2016 | Huang et al. |

FOREIGN PATENT DOCUMENTS

| | | |
|---|---|---|
| CN | 102497438 A | 6/2012 |
| CN | 105554311 A | 5/2016 |
| JP | 2006-300734 A | 11/2006 |
| JP | 2007-193656 A | 8/2007 |
| JP | 2008-64616 A | 3/2008 |
| WO | 2016060863 A2 | 4/2016 |

OTHER PUBLICATIONS

Extended European search report (EESR) dated Jun. 22, 2018 in a counterpart European application.
Office Action dated Jan. 21, 2020 in a corresponding Japanese patent application.
Office Action dated Feb. 3, 2020 in a related Chinese patent application.

* cited by examiner

*Primary Examiner* — Thanh Luu
(74) *Attorney, Agent, or Firm* — Metrolex IP Law Group, PLLC (57) ABSTRACT

An environmental sensor for measuring physical quantities associated with a surrounding environment includes one or more sensor elements that detect the physical quantities, and a user recognition unit that recognizes a change in a physical quantity detected by at least one of the sensor elements as being caused by a user when the physical quantity changes in accordance with a predetermined rule.

2 Claims, 9 Drawing Sheets

ENVIRONMENTAL SENSOR

CROSS REFERENCE TO RELATED APPLICATIONS

This application claims priority from prior Japanese Patent Application No. 2017-047854 filed with the Japan Patent Office on Mar. 13, 2017, the entire contents of which are incorporated herein by reference.

FIELD

The disclosure relates to an environmental sensor that measures a plurality of physical quantities associated with a surrounding environment.

BACKGROUND

Devices including various measurement units for obtaining biometric information about a user or environmental information about the surrounding environment have been developed (e.g., Patent Literature 1). A device described in Patent Literature 1 includes a plurality of measurement units and a notification unit. Also, various sensor elements have been developed to detect physical quantities including temperature, humidity, atmospheric pressure, and a light level. Micro electro mechanical systems (MEMS) sensor elements (hereafter also referred to as MEMS sensors) using MEMS technology, which are compact and consume low power, now receive attention. Such compact and low power MEMS sensor elements may be incorporated in a single device, enabling the design of an environmental sensor including multiple different sensor elements.

An environmental sensor with this structure can detect multiple physical quantities associated with, for example, an office environment or a living space, and can obtain, for example, various items of information such as biometric information and environmental information, in addition to energy-related information such as electric power. Such information can then be used to support multidirectional analysis and use of information.

An environmental sensor including multiple sensor elements is typically installed at a fixed location for continuously measuring the environment for a fixed duration. However, the environmental sensor may be unintentionally moved to a different location or its power may be shut. For example, a plug-in environmental sensor may be moved together with its power strip, or an environmental sensor installed on a piece of furniture indoors may be moved together with the furniture. The environmental sensor may be stolen by a third party, or may be moved by a deceptive third party.

In this case, data obtained after the installation state of the environmental sensor changes can differ from data intended initially. If the measurement is continued using the environmental sensor without the state change being detected, the resultant data can either be useless or be used to produce wrong conclusions.

CITATION LIST

Patent Literature

Patent Literature 1: Japanese Unexamined Patent Application Publication No. 2006-300734

Patent Literature 2: Japanese Unexamined Patent Application Publication No. 2008-64616

SUMMARY

Technical Problem

In response to the above issue, the environmental sensor may include a unit for receiving a command for authenticating a user (user verification). When the environmental sensor is moved or its power is shut without the user being authenticated, a unit in the sensor may generate an alert indicating unauthorized moving or power shutting.

However, to transmit a command to the environmental sensor, terminals including mobile terminals are used (in other words, user authentication cannot be performed without such terminals). The input unit for receiving a command can increase the size and the complexity of the environmental sensor, and thus increases the cost.

In response to the above situation, one or more aspects are directed to a unit for recognizing a user using sensor elements included in an environmental sensor, without using other terminals and/or adding other mechanical components to the sensor.

Solution to Problem

In response to the above issue, one or more aspects have the features described below.

One or more aspects may provide an environmental sensor for measuring physical quantities associated with a surrounding environment including one or more sensor elements that detect the physical quantities, and a user recognition unit that recognizes a change in a physical quantity detected by at least one of the sensor elements as being caused by a user when the physical quantity changes in accordance with a predetermined rule.

The user recognition performed by the environmental sensor according to one or more aspects may refer to recognizing a change in a physical quantity detected by at least one of the sensor elements as being caused by a user when the physical quantity changes in accordance with a predetermined rule. This user recognition is enabled by intentionally changing the target physical quantities detected by the sensor elements inherently included in the environmental sensor in accordance with the predetermined rule. The user recognition can be performed using the sensor elements included in the environmental sensor, without using other terminals and/or adding other mechanical components to the sensor.

The environmental sensor may further include an installation state change detection unit that detects a change in an installation state of the environmental sensor, and an abnormality processing unit that performs predetermined abnormality processing when the change in the installation state of the environmental sensor is detected without recognition being achieved by the user recognition unit.

When, for example, the installation state of the environmental sensor is changed as unintended by the user (e.g., moved or shut down), this structure prevents the change from causing subsequent data collection unintended and unnoticed by the user.

The predetermined rule may include the physical quantity detected by the at least one of the sensor elements being maintained lower than a first predetermined threshold for a first predetermined duration after the physical quantity decreases from a value higher than the first predetermined threshold to a value lower than the first predetermined threshold. The predetermined rule may also include the physical quantity detected by the at least one of the sensor elements being maintained higher than a second predetermined threshold for a second predetermined duration after the physical quantity increases from a value lower than the second predetermined threshold to a value higher than the second predetermined threshold.

The target physical quantities changing above and below a predetermined threshold are used as the initial conditions to prevent repeated erroneous user recognition under an environmental condition that causes the target physical quantities to remain higher or lower than the predetermined threshold. The predetermined threshold for each target physical quantity may be set to a value that is normally undetectable to prevent erroneous user recognition by an accidental change in the surrounding environment.

The predetermined rule may also include the physical quantity detected by the at least one of the sensor elements changing to a value higher than a third predetermined threshold and a value lower than the third predetermined threshold repeatedly a predetermined number of times within a third predetermined duration.

As described above, the target physical quantity values changing like pulse signals are used as a rule to prevent a third party other than a user who knows the rule (authorized user) from erroneously achieving user recognition.

The predetermined rule may also include the physical quantity detected by the at least one of the sensor elements changing by at least a predetermined value within a fourth predetermined duration.

As described above, changes in the target physical quantities are used as the conditions to promptly perform user recognition without much time and efforts.

The above conditions may be combined as the predetermined rule. For example, the illuminance being maintained lower than a predetermined threshold and the sound pressure level being maintained higher than a predetermined threshold may be combined as the predetermined rule for more accurate user recognition.

The physical quantity detected by the at least one of the sensor elements may be an illuminance. The illuminance as a target physical quantity may be intentionally changed or maintained easily by, for example, blocking light to be detected by an illuminance sensor or illuminating the illuminance sensor with a lighting tool. The environmental sensor may include an illuminance sensor element to detect an illuminance. This allows the physical quantity to be intentionally changed easily in accordance with the predetermined rule.

One or more aspects may provide a method for recognizing a user of an environmental sensor including one or more sensor elements that detect physical quantities associated with a surrounding environment and to be installed at an intended place. The method includes detecting the physical quantities in a surrounding environment with the sensor elements included in the environmental sensor, determining a change in a physical quantity in accordance with a predetermined rule detected by at least one of the sensor elements included in the environmental sensor, and recognizing a change in a physical quantity as being caused by the user when determining that the physical quantity changes in accordance with the predetermined rule.

One or more aspects may provide a program enabling the environmental sensor to implement the steps included in the method for recognizing a user of the environmental sensor.

The above aspects for solving the issues may be used in combination.

Advantageous Effects

One or more aspects may allow a unit for user recognition using sensor elements included in an environmental sensor, without using other terminals and/or adding other mechanical components to the sensor.

DETAILED DESCRIPTION

Embodiments will now be described in detail by way of example with reference to the drawings.

First Embodiment

Figure 1:
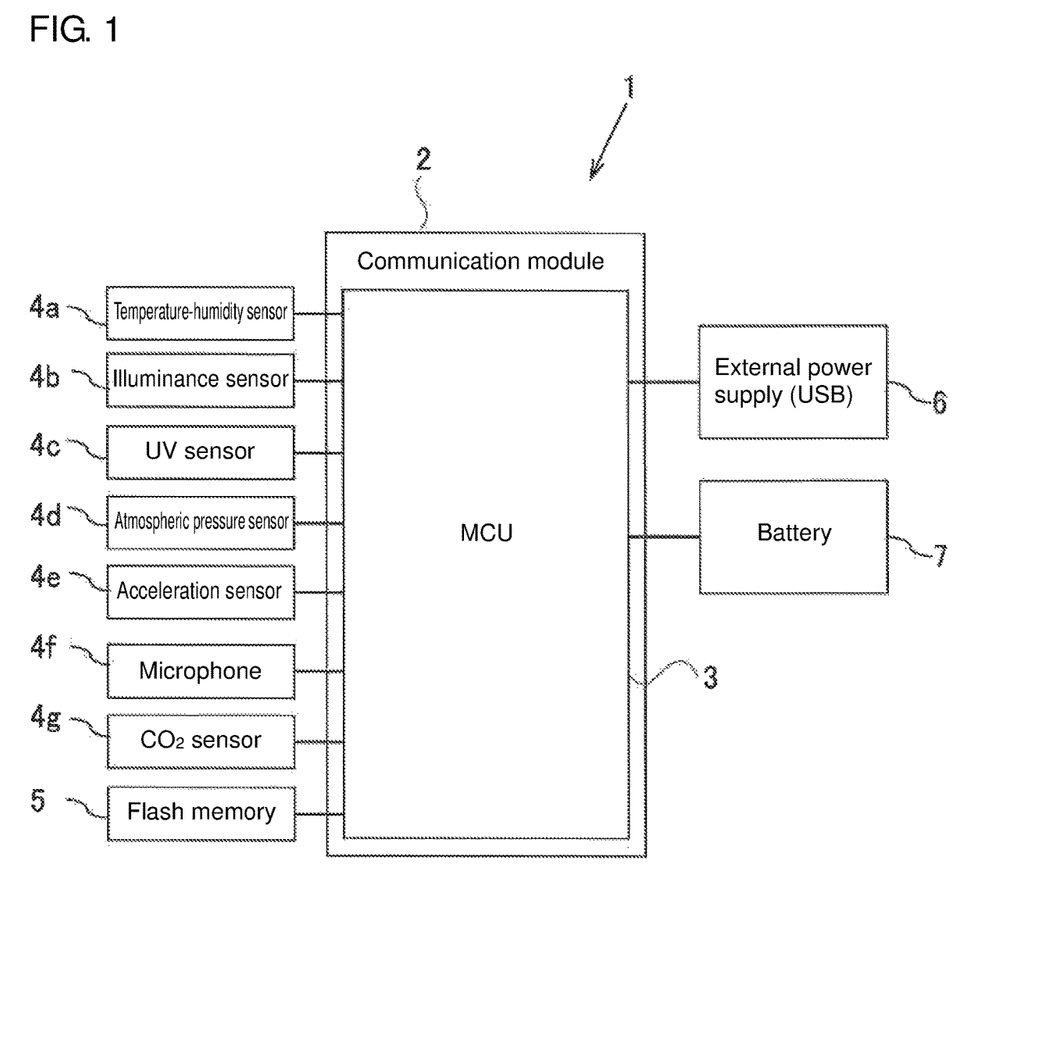
FIG. 1 is a block diagram illustrating an environmental sensor unit according to an embodiment.

FIG. 1 is a block diagram of an environmental sensor unit 1 that serves as an environmental sensor according to an embodiment. The environmental sensor unit 1 includes a plurality of sensors 4a to 4g, which serve as sensor elements, a flash memory 5, which temporarily stores measurement results, a communication module 2, which allows communication with an external device, and a micro controller unit (MCU) 3, which is a processing unit. More specifically, the sensors 4a to 4g include a temperature-humidity sensor 4a, an illuminance sensor 4b, an ultraviolet (UV) sensor 4c, an atmospheric pressure (absolute pressure) sensor 4d, an acceleration sensor 4e, a microphone (acoustic sensor) 4f, and a $CO_2$ sensor 4g. These sensors can continuously obtain environmental data about the surrounding environment of the environmental sensor unit 1. The communication module 2 communicates with a remote controller (not shown), such as a smartphone, to transmit environmental data detected by the sensors 4a to 4g to the remote controller and to receive control signals for controlling the environmental sensor unit 1 from the remote controller.

The flash memory 5 can temporarily store data measured by the sensors 4a to 4g to prevent loss of various items of environmental data when the communication with the communication module 2 is disabled. The MCU 3 controls the sensors 4a to 4g, the flash memory 5, and the communication module 2. The environmental sensor unit 1 includes a connecting terminal for connection to an external power supply 6, and a housing for a battery 7. The environmental sensor unit 1 can thus be driven both by the external power supply 6 through, for example, a universal serial bus (USB), and by the battery 7.

Figure 2A:
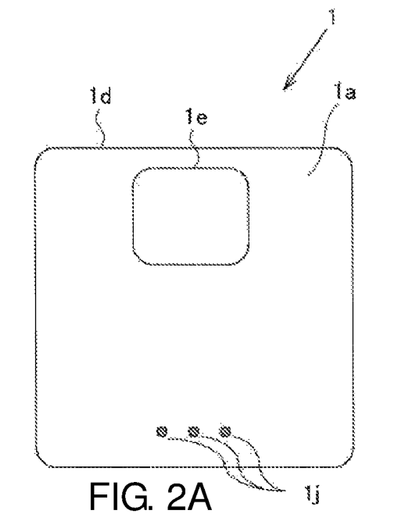
FIGS. 2A to 2C are external three views illustrating an environmental sensor unit according to a first embodiment.
Figure 2B:
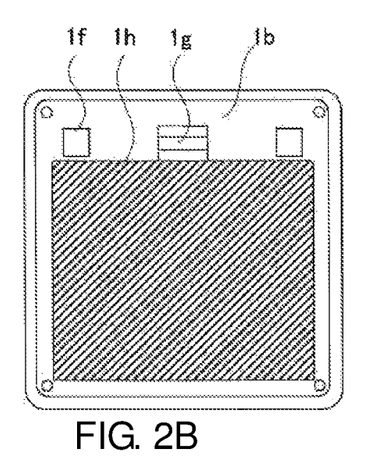
Figure 2C:
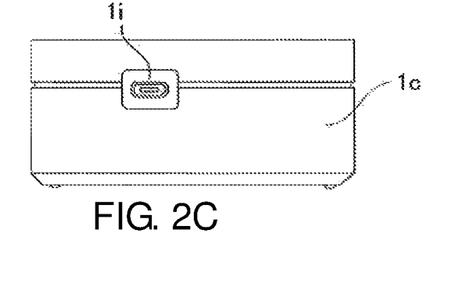

FIGS. 2A to 2C are external views of the environmental sensor unit 1 according to an embodiment. FIG. 2A is a front view of the environmental sensor unit 1 viewed from its front surface 1a, FIG. 2B is a back view of the environmental sensor unit 1 viewed from its back surface 1b, and FIG. 2C is a side view of the environmental sensor unit 1 viewed from its one side surface 1c. The environmental sensor unit 1 according to an embodiment includes a rectangular parallelepiped casing 1d, which is substantially square when viewed from the front surface 1a, and is substantially rectangular when viewed from the side surface 1c. The components shown in FIG. 1 (excluding the external power supply 6) are contained in the casing 1d.

The environmental sensor unit 1 is placed on the floor with its back surface 1b on the floor surface, or is hung on the wall with its back surface 1b facing the wall surface to have its front surface 1a exposed to the outside environment. The front surface 1a has a lighting window 1e for collecting visible light and UV light. The lighting window 1e is formed from a material that transmits visible light and UV light. The intensity of the visible light passing through the lighting window 1e is detected by the illuminance sensor 4b, and the intensity of the UV light passing through the lighting window 1e is detected by the UV sensor 4c. This enables measurement of the illuminance and the UV light.

The front surface 1a further has vents 1j, which allow the outside air to flow into the environmental sensor unit 1. The target physical quantities are measured by the temperature-humidity sensor 4a, the atmospheric pressure sensor 4d, the microphone 4f, and the $CO_2$ sensor 4g using the outside air around the environmental sensor unit 1 flowing through the vents 1j into the environmental sensor unit 1.

The environmental sensor unit 1 has, on its back surface 1b, a lock tab 1g for opening and closing a back lid on the back surface 1b, recesses 1f that are to be engaged with wall hooks (not shown) to allow mounting on the wall, and a magnet 1h that allows installation on a piece of furniture formed from a ferromagnetic material. The back lid (not shown) is arranged below the magnet 1h, and can internally receive a battery mountable for a battery-powered operation. Also, the side surface 1c has a connector 1i for connection to the external power supply 6. The environmental sensor unit 1 installed at a location where environmental information is to be obtained enables continuous measurement of information including temperature and humidity, illuminance, UV light intensity, barometric pressure (absolute pressure), acceleration under vibrations or other factors, noise, and $CO_2$.

As described above, this type of environmental sensor unit 1 is designed to be installed at a location exposed to the environment in which environmental information is continuously obtained. However, the environmental sensor unit 1 may be moved by, for example, a malicious or careless third party as unintended by the user. More specifically, the environmental sensor unit 1 may be moved to a different location by a deceptive third party, or the environmental sensor unit 1 fixed to a piece of furniture or a power strip may be moved together with the furniture or the power strip by a careless third party.

In this case, environmental data obtained during or after such moving can be the data unintended by the user, which can cause wasted time and energy. Further, the user using such environmental data without noticing the wrong data may obtain erroneous measurement results.

In an embodiment, the environmental sensor unit 1 determines that the environmental sensor unit 1 has been moved using initially obtainable information, and performs processing as appropriate. More specifically, when the environmental sensor unit 1 determines that the environmental sensor unit 1 has been moved, the communication module 2 transmits an alert signal to a remote controller (not shown), such as a smartphone. This processing corresponds to predetermined abnormality processing in one or more embodiments.

The moving of the environmental sensor unit 1 may be determined by the MCU 3 based on, for example, a predetermined threshold of the physical quantity detected by the acceleration sensor 4e, or a predetermined condition combining the predetermined threshold and changes in the physical quantities detected by other sensors. The MCU 3 controls the communication module 2 to transmit an alert signal. In other words, the MCU 3 functions as an installation state change detection unit and an abnormality processing unit in one or more embodiments.

When the moving of the environmental sensor unit 1 is detected after user recognition is achieved, no abnormality processing is performed in an embodiment. This prevents an alert signal from being transmitted when a user intentionally moves the environmental sensor unit 1, or specifically when the environmental sensor unit 1 is temporarily or permanently installed at a different location, or when the environmental sensor unit 1 is carried by a user to collect data.

The above user recognition is performed by the MCU 3 determining that a change in a physical quantity detected by at least one of the sensors 4a to 4g included in the environmental sensor unit 1 is caused by a user when the physical quantity changes in accordance with a predetermined rule. In other words, the MCU 3 according an embodiment also functions as a user recognition unit in one or more embodiments. In an embodiment, the MCU 3 achieves user recognition when the illuminance detected by the luminance sensor 4b has changed in accordance with a predetermined rule.

Figure 3:
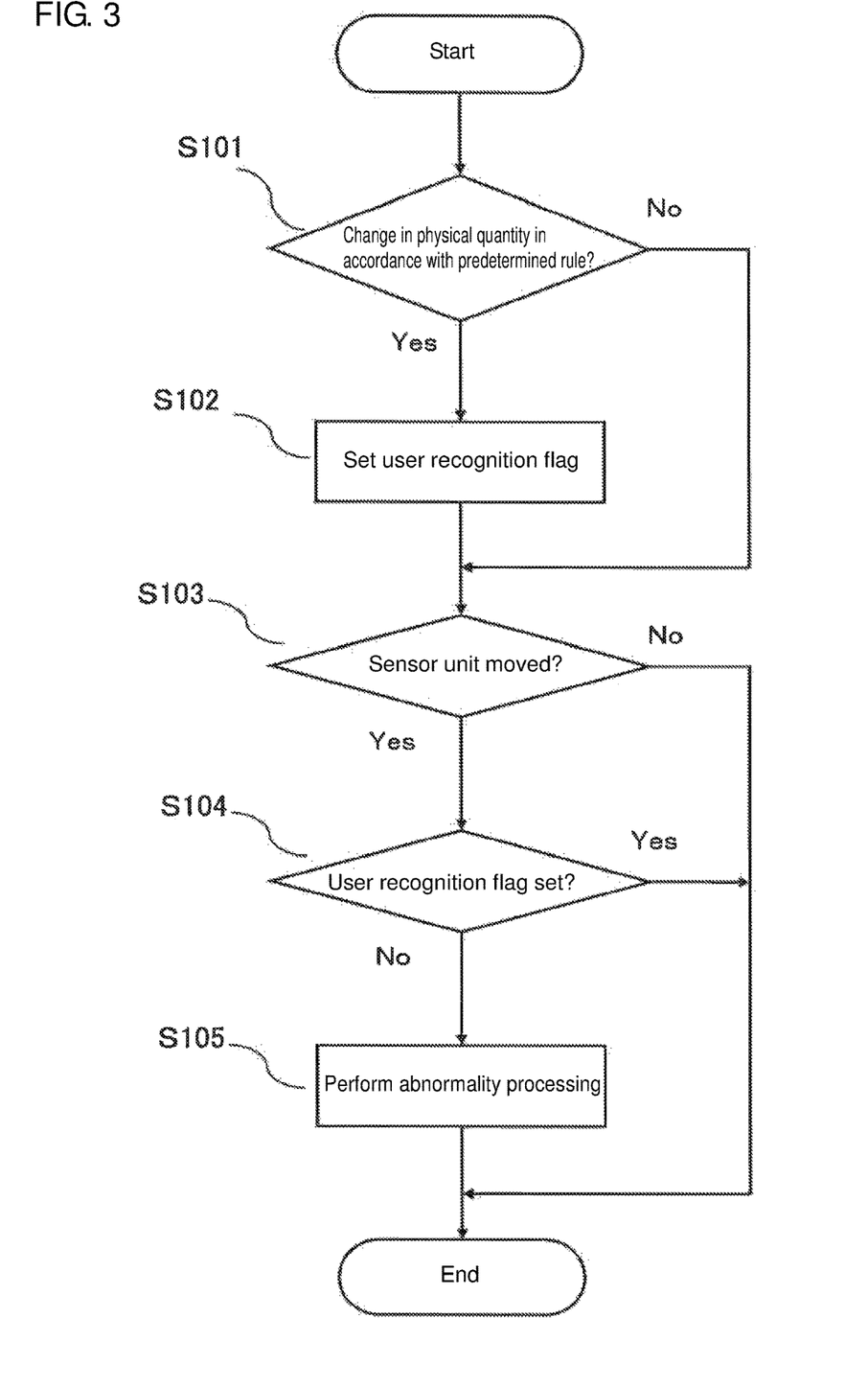
FIG. 3 is a flowchart illustrating abnormality processing according to a first embodiment.

FIG. 3 is a flowchart showing abnormality processing according to an embodiment. This routine is a program stored in a memory (not shown; the same applies hereafter) of the MCU 3, and is executed repeatedly by a processor (not shown; the same applies hereafter) included in the MCU 3 at predetermined intervals.

When this routine is started, the processor first determines whether the illuminance values detected by the illuminance sensor 4b have changed in accordance with a predetermined rule (in other words, whether user recognition described below has been achieved) in step S101. When the illuminance values have changed in accordance with the predetermined rule, the processing advances to step S102, in which a user recognition flag is set. The processing then advances to step S103. When user recognition has not been achieved in step S101, the processing advances directly to step S103.

In step S103, the processor determines whether the acceleration data detected by the acceleration sensor 4e exceeds a predetermined threshold. This equates to the processing for determining whether the environmental sensor unit 1 has been moved. The predetermined threshold may include changes in acceleration when the environmental sensor unit 1 is moved by a person. The predetermined threshold may be set to a value that is experimentally determined to exclude changes in acceleration caused by an earthquake or other phenomena.

When the acceleration data does not exceed the predetermined threshold in step S103, the processor determines that the environmental sensor unit 1 has not been moved (in other words, no change occurs in the installation state), and ends the routine.

When the acceleration data exceeds the predetermined threshold in step S103, the processor determines that the environmental sensor unit 1 has been moved, and advances the processing to step S104, in which the processor determines whether the moving is intended by the user. In step S104, the processor determines whether a user recognition flag is set in step S102. When a user recognition flag is set, the processor determines that the environmental sensor unit 1 has been intentionally moved by the user, and ends the routine.

When determining that no user recognition flag is set in step S104, the processor determines that the environmental sensor unit 1 has been moved as unintended by the user (abnormal state). The processing then advances to step S105.

In step S105, the processor performs predetermined abnormality processing. In this processing, the processor transmits, from the communication module 2 to a remote controller (not shown), such as a smartphone, an alert signal indicating that the environmental sensor unit 1 has been moved. When the processing in step S105 is complete, the routine ends.

Figure 4:
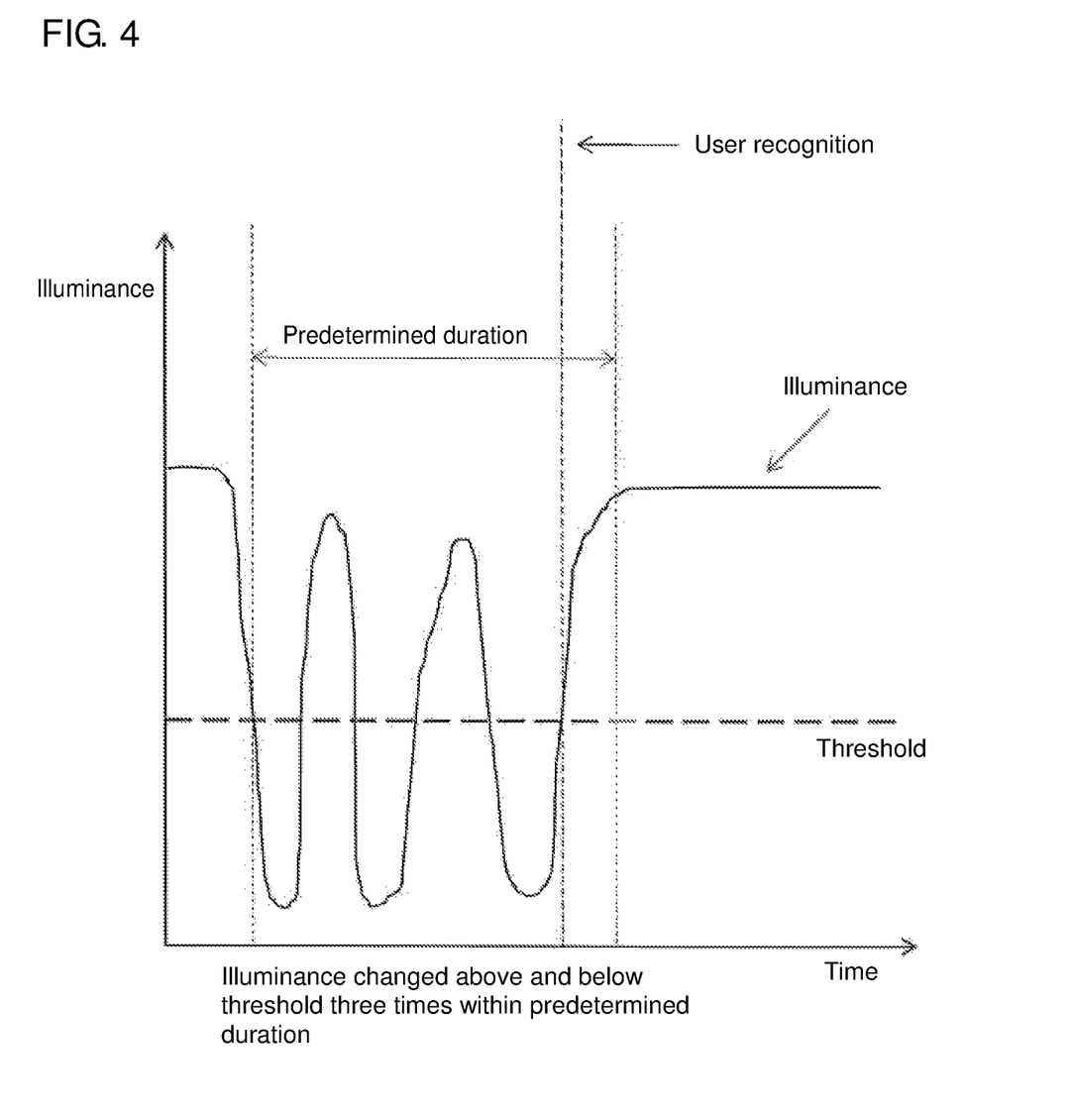
FIG. 4 is a graph illustrating a predetermined rule for user recognition according to a first embodiment.

Referring now to FIG. 4, the predetermined rule for determining whether user recognition has been achieved in step S101 will be described. When the illuminance changes in accordance with the predetermined rule described below, the processor determines that user recognition has been achieved in step S101.

FIG. 4 is a graph showing the relationship between the illuminance detected by the illuminance sensor 4b in the environmental sensor unit 1 on the vertical axis, and time on the horizontal axis, indicating the timing of user recognition. As shown in FIG. 4, the MCU 3 achieves user identification when the illuminance value detected by the illuminance sensor 4b decreases below a predetermined threshold (e.g., 5 lux), and increases above the predetermined threshold repeatedly a predetermined number of times (e.g., three times) within a predetermined duration (e.g., within ten seconds). In an embodiment, the predetermined rule in one or more embodiments corresponds to the illuminance detected by the illuminance sensor 4b repeatedly decreasing below 5 lux and increasing above 5 lux three times within ten seconds.

To change the illuminance detected by the illuminance sensor 4b in accordance with the predetermined rule in an embodiment, for example, the user may cover the lighting window 1e in the environmental sensor unit 1 with his or her hand to block light incident on the illuminance sensor 4b and then immediately remove the hand to uncover the lighting window 1e to allow the illuminance sensor 4b to detect light entering through the lighting window 1e. This operation may be repeated three times within ten seconds.

In an embodiment, as described above, the moving of the environmental sensor unit 1 is determined based on the values detected by the acceleration sensor 4e in the environmental sensor unit 1 in an embodiment. When the moving of the environmental sensor unit 1 is determined without user recognition being achieved, abnormality processing for transmitting an alert signal to the user is performed. Additionally, user recognition is achieved when the illuminance values measured by the illuminance sensor 4b in the environmental sensor unit 1 change in accordance with the predetermined rule. This structure reduces wasted time and energy resulting from the environmental sensor unit 1 continuously obtaining data unintended by the user and reduces wrong conclusions based on erroneous measurement results, without using other terminals and/or adding other mechanical components to the sensor unit. After user recognition is achieved, no abnormality processing is performed. This structure can meet a user request for intentionally moving the environmental sensor unit 10 and using the sensor unit at a different location.

Modifications

Although the environmental sensor unit 1 in the above embodiment is designed to operate continuously (on electric power from the battery 7) after moved, the processing for the environmental sensor unit 1 that operates simply on electric power supplied from an external power supply will now be described with reference to FIG. 5. This processing corresponds to predetermined abnormality processing performed when the power supply to the environmental sensor unit 1 is shut, such as when no battery 7 is mounted in the environmental sensor unit 1 or the battery 7 runs out. The environmental sensor unit 1 performs predetermined abnormality processing when the power shutting is unintended by the user.

Figure 5:
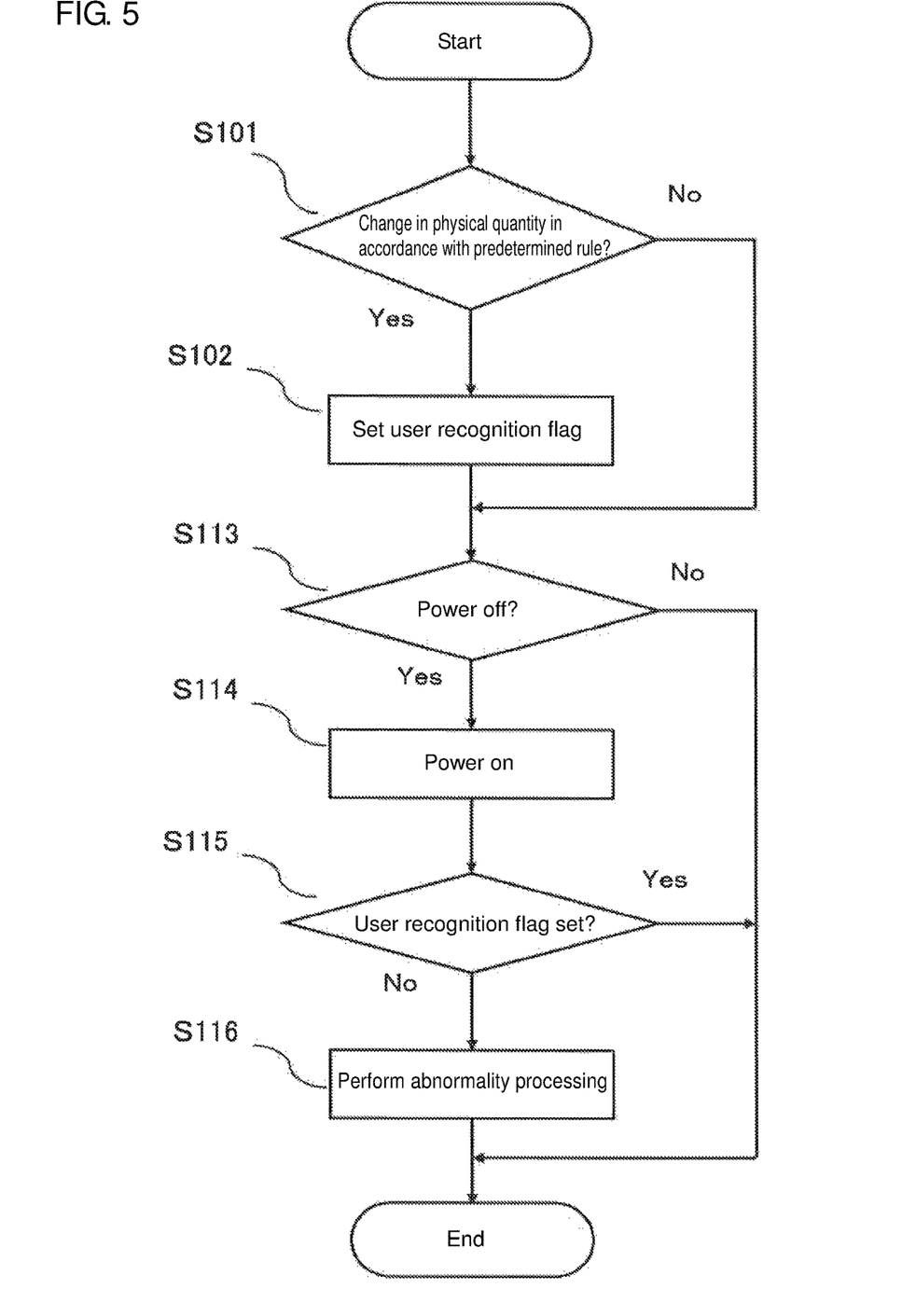
FIG. 5 is a flowchart illustrating abnormality processing according to a modification of a first embodiment.

FIG. 5 is a flowchart showing the abnormality processing according to the present modification. The processing up to step S102 is the same as described above in the first embodiment, and will not be described. In the present modification, the processing branches differently depending on whether electric power supply to the environmental sensor unit 1 is shut (or whether the environmental sensor unit 1 stops operating) in step S113.

When the electric power supply is not shut, the processor detects no abnormality, and ends the routine. When the electric power supply to the environmental sensor unit 1 is shut and resumed (step S114), the processor determines whether the power shutting is intended by the user (step S115). More specifically, the processor determines whether a user recognition flag is set in step S102. When a user recognition flag is set, the processor determines that the power shutting of the environmental sensor unit 1 is intended by the user in step S115, and ends the routine.

When no user recognition flag is set in step S115, the processor determines that the power shutting of the environmental sensor unit 1 is unintended by the user (abnormal). The processing then advances to step S116 to perform predetermined abnormality processing.

In step S116, the processor performs the predetermined abnormality processing by transmitting an alert signal indicating that electric power supply to the environmental sensor unit 1 from the communication module 2 to a remote controller (not shown), such as a smartphone, is shut and resumed. The processor may stop collecting environmental information until a predetermined resume process is performed.

In the modification described above, the abnormality processing may be performed when the power supply to the environmental sensor unit 1 is shut unintentionally without a user operation.

Second Embodiment

A second embodiment will now be described. In an embodiment, user recognition is achieved based on changes in a different physical quantity measured by the environmental sensor unit 1, or specifically the sound pressure level detected by the microphone 4f. An embodiment differs from the first embodiment only in the physical quantity used for user recognition and the predetermined rule. The components of the environmental sensor unit 1 and the abnormality processing in an embodiment are equivalent to those in the first embodiment. The corresponding components and processes are given the same reference numerals and will not be described in detail.

Figure 6:
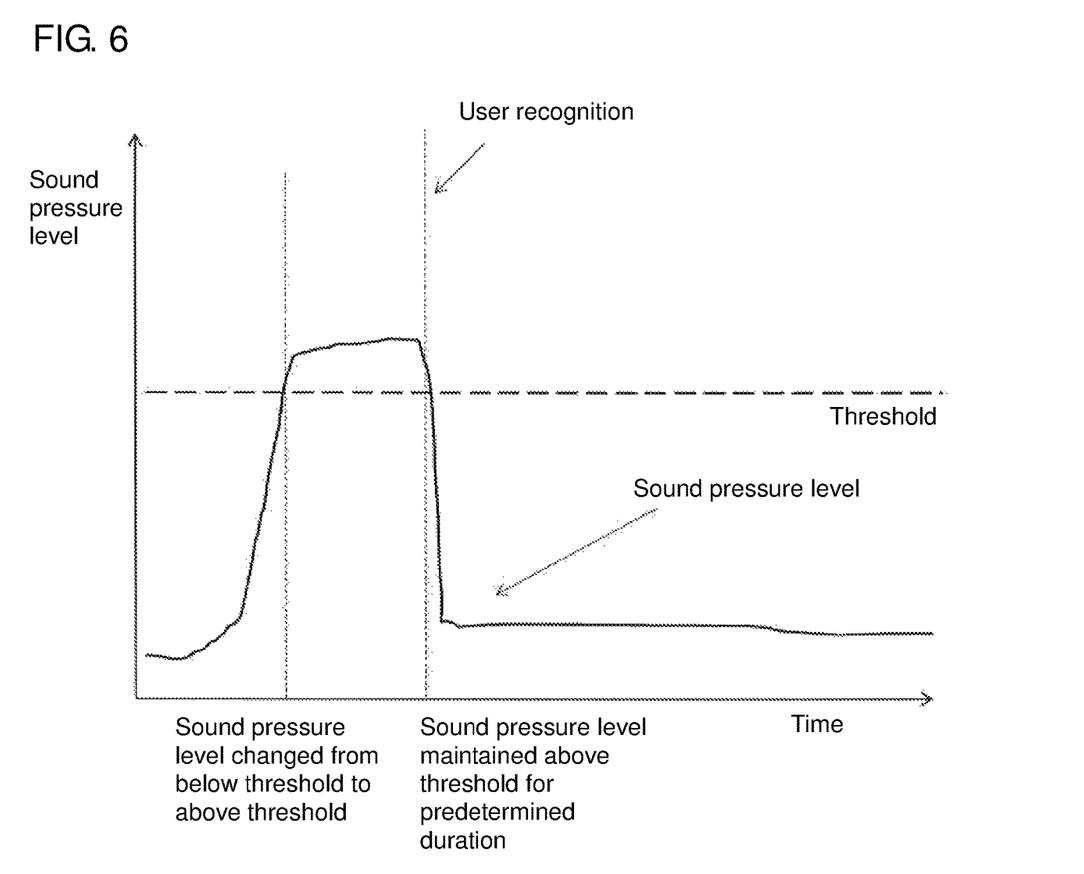
FIG. 6 is a graph illustrating a predetermined rule for user recognition according to a second embodiment.

FIG. 6 is a graph showing the relationship between the sound pressure level detected by the microphone 4f on the vertical axis, and time on the horizontal axis, indicating the timing of user recognition. As shown in FIG. 6, the MCU 3 determines that changes in the physical quantity are caused by a user when the sound pressure level detected by the microphone 4f remains higher than a predetermined threshold (e.g., 70 decibels) for at least a predetermined duration (e.g., five seconds) after the sound pressure level increases from a value lower than the threshold to a value higher than the threshold. In an embodiment, the predetermined rule corresponds to the sound pressure level detected by the microphone 4f being maintained higher than 70 decibels for five seconds after the sound pressure level increases from a value lower than 70 decibels to a value higher than 70 decibels in the claims.

To change the sound pressure level detected by the microphone 4f in accordance with the predetermined rule in an embodiment, for example, the user may produce a loud voice continuously for five seconds toward the vents 1j in the environmental sensor unit 1.

With the predetermined rule for user recognition according to an embodiment, the environmental sensor unit 1 installed at a place difficult to access by the user, such as a high place, can easily perform user recognition.

Third Embodiment

A third embodiment will now be described. In an embodiment, user recognition is achieved based on changes in a plurality of physical quantities measured by the environmental sensor unit 1, or specifically illuminance data and $CO_2$ data.

Figure 7:
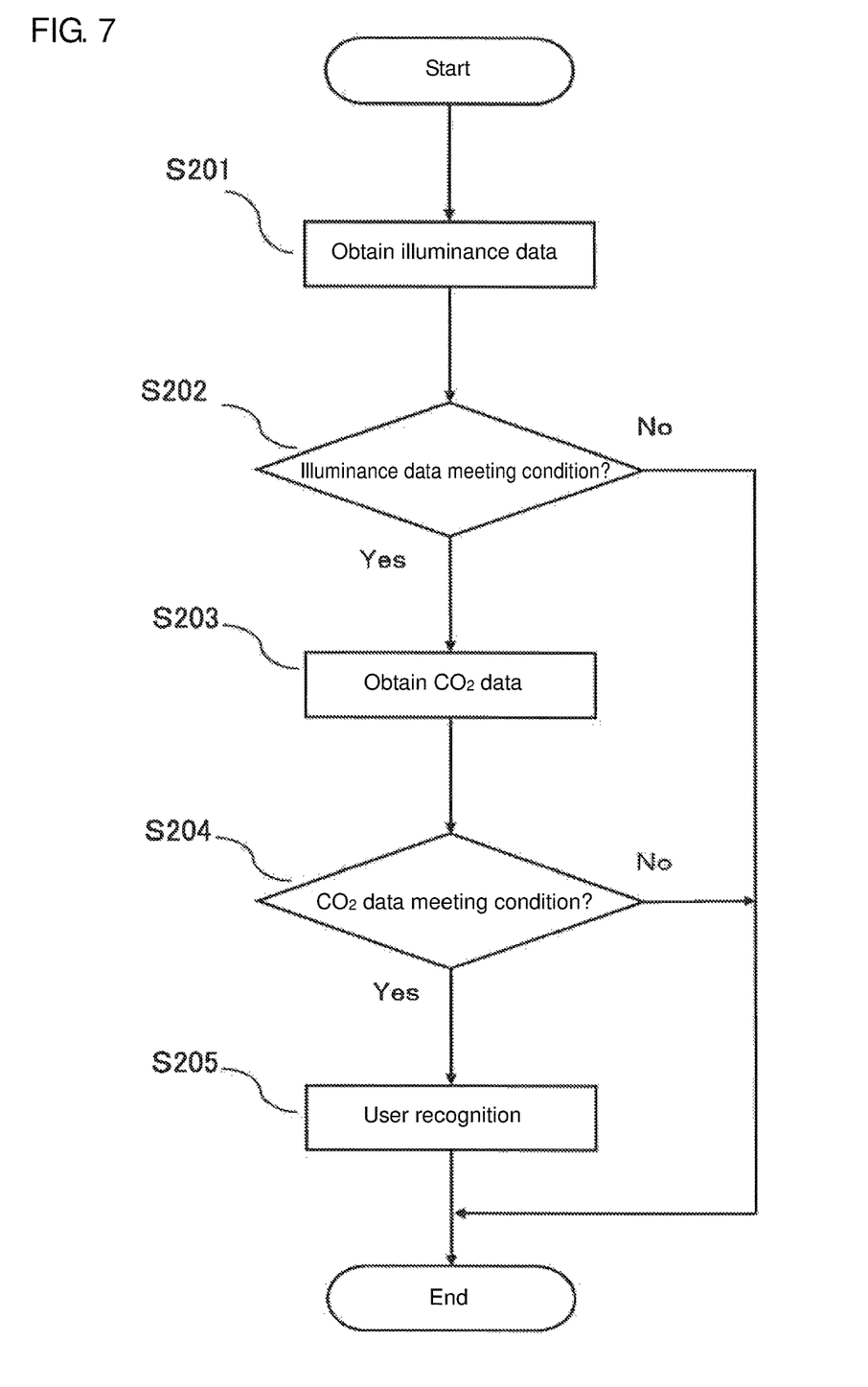
FIG. 7 is a flowchart illustrating user recognition processing together with a predetermined rule for user recognition according to a third embodiment.

FIG. 7 is a flowchart showing the processing for the MCU 3 performing user recognition according to an embodiment. This routine is a program stored in the memory included in the MCU 3, and is executed repeatedly by the processor included in the MCU 3 at predetermined intervals.

When this routine is started, illuminance data detected by the illuminance sensor 4b is first obtained in step S201. After the processing in step S201 is complete, the processing advances to S202. In step S202, the processor determines whether the obtained illuminance data remains lower than a predetermined illuminance threshold for at least a predetermined duration after the illuminance data decreases from a value higher than the threshold to a value lower than the threshold. This corresponds to the processing for detecting a blocked state of light incident on the illuminance sensor 4b through the lighting window 1e in the environmental sensor unit 1.

When the obtained illuminance data remains lower than a predetermined illuminance threshold for a predetermined duration (e.g., five seconds) after the illuminance data decreases from a value higher than the threshold to a value lower than the threshold in step S202, the processing advances to step S203. When this determination is not performed in step S202, the routine ends.

In step S203, $CO_2$ data detected by the $CO_2$ sensor 4g is obtained. After the processing in step S203 is complete, the processing advances to S204. In step S204, the processor determines whether changes in the obtained $CO_2$ values within a predetermined duration (e.g., two seconds) exceed a predetermined $CO_2$ variation threshold. The $CO_2$ variation threshold may be set to the lower limit $CO_2$ variation that is experimentally determined by measuring a $CO_2$ variation caused by a user's intentional operation, such as blowing breath onto the environmental sensor unit 1, rather than being caused by a normal factor in the surrounding environment that can affect the environmental sensor unit 1.

When the change in $CO_2$ within the predetermined duration is determined to exceed the predetermined $CO_2$ variation threshold in step S204, the processing advances to step S205. In step S205, the MCU 3 achieves user recognition by determining that the change in the surrounding environment of the environmental sensor unit 1 is caused by the user, and ends the routine.

When the change in $CO_2$ within the predetermined duration is less than the predetermined $CO_2$ variation threshold in step S204, the processor determines that the decrease in the illuminance detected in step S202 is caused by a normal factor (e.g., light turned off or light blocked by a movable object), and ends the routine, without the processing advancing to step S205. The entire abnormality processing performed by the environmental sensor unit 1 is equivalent to the processing shown in the first embodiment, and will not be described.

In an embodiment, as described above, the predetermined rule defining a condition for user recognition is a combination of maintaining the illuminance detected by the illuminance sensor 4b lower than the predetermined illuminance threshold for a predetermined duration after the illuminance decreases from a value higher than the threshold to a value lower than the threshold, and determining that the change in $CO_2$ detected by the $CO_2$ sensor 4g exceeds a predetermined variation for a predetermined duration. The combination of such different measurement targets and measuring methods prevents erroneous recognition based on accidental changes in the surrounding environment in accordance with the predetermined rule, and thus enables more reliable user recognition. To change the illuminance and $CO_2$ values in accordance with the predetermined rule in an embodiment, for example, the user may blow breath toward the vents 1j in the environmental sensor unit 1 while covering the lighting window 1e in the environmental sensor unit 1 with his or her hand continuously to block light incident on the illuminance sensor 4b.

Fourth Embodiment

A fourth embodiment will now be described. An environmental sensor of another type according to an embodiment will be described.

Figure 8A:
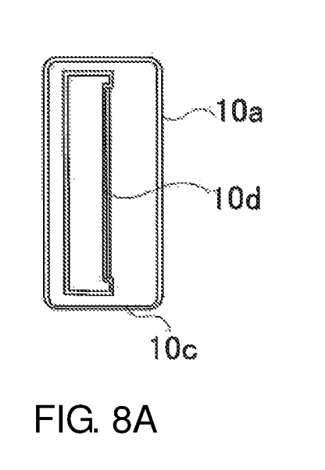
FIGS. 8A to 8C are external three views illustrating an environmental sensor unit according to a fourth embodiment.
Figure 8B:
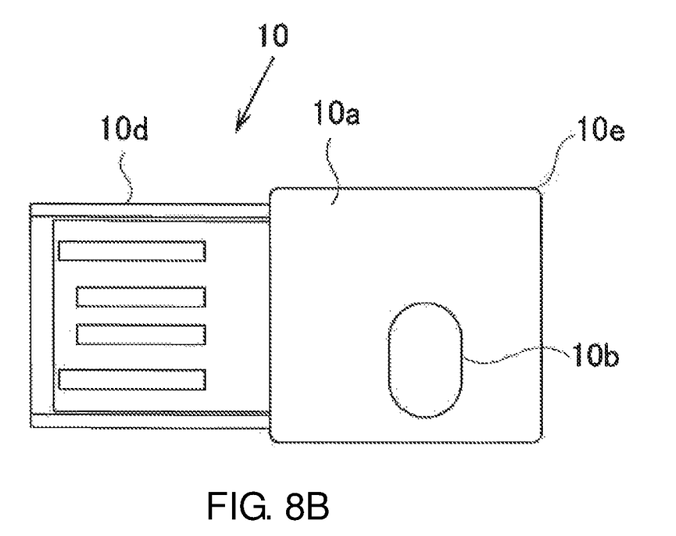
Figure 8C:
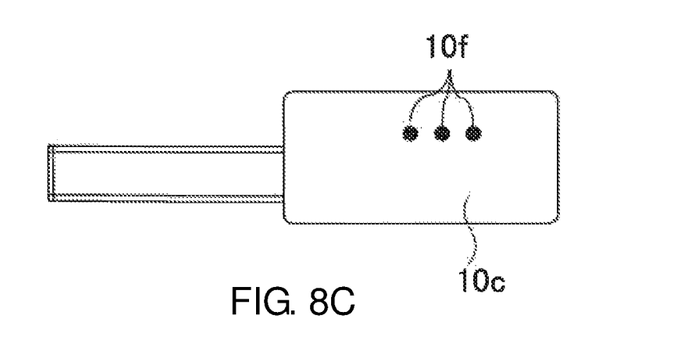

FIGS. 8A to 8C are external views of an environmental sensor unit 10 according to an embodiment. The environmental sensor unit 10 uses a USB sensor. FIG. 8A is a side view of the environmental sensor unit 10 viewed from the distal end of a USB connector 10d. FIG. 8B is a front view of the environmental sensor unit 10 viewed from its front surface 10a. FIG. 8C is a side view of the environmental sensor unit 10 viewed from its one side surface 10c. The body of the environmental sensor unit 10 according to an embodiment includes a rectangular parallelepiped casing 10e, which is substantially square when viewed from the front surface 10a and is substantially rectangular when viewed from the side surface 10c. The casing 10e contains the components shown in FIG. 1 (excluding the external power supply 6).

The environmental sensor unit 10, which includes the USB connector 10d, allows the obtained data to be either transmitted using the communication module 2 communicable with a remote controller, or to be directly provided to a remote controller such as a personal computer using the USB connector 10d. The environmental sensor unit 10 also has its front surface 10a having a lighting window 10b for collecting visible light and UV light. The lighting window 10b is formed from a material that transmits visible light and UV light. The intensity of the visible light passing through the lighting window 10b is detected by the illuminance sensor 4b, and the intensity of the UV light passing through the lighting window 10b is detected by the UV sensor 4c. This enables measurement of the illuminance and the UV light.

The side surface 10c has vents 10f, which allow the outside air to flow into the environmental sensor unit 10. The target physical quantities are measured by the temperature-humidity sensor 4a, the barometric pressure sensor 4d, the microphone 4f, and the $CO_2$ sensor 4g using the outside air around the environmental sensor 10 flowing through the vents 10f into the environmental sensor unit 10.

The environmental sensor unit 10 can be powered from an external power supply (a USB connector mounted device) through the USB connector 10d, or may operate on a battery (not shown) contained in the casing 10e.

Figure 9:
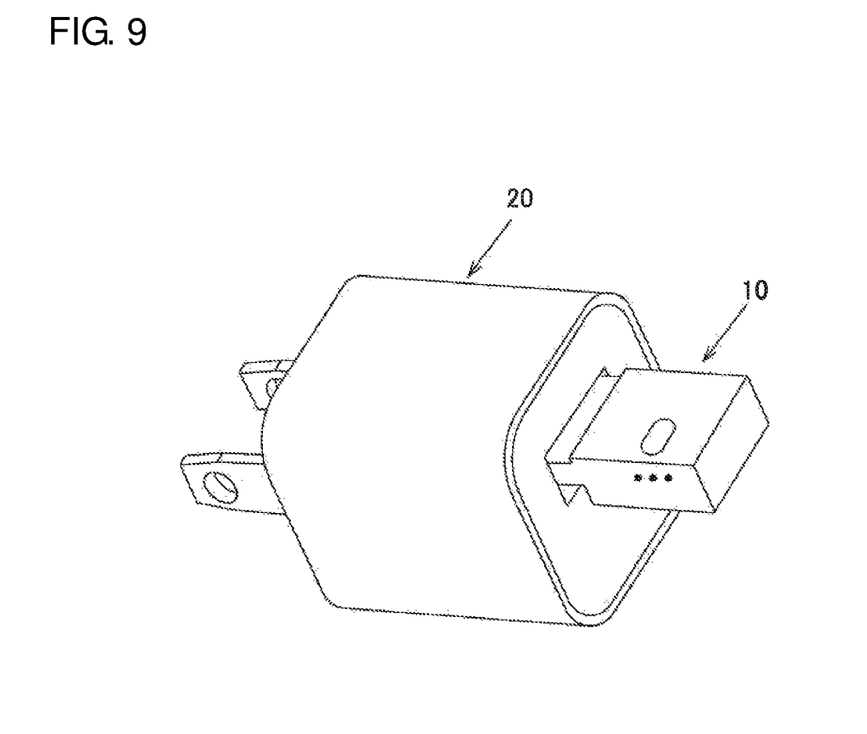
FIG. 9 is an external perspective view illustrating an environmental sensor unit and an outlet adapter according to a fourth embodiment.

FIG. 9 is a perspective view of the environmental sensor unit 10 connected to an outlet adapter 20. The environmental sensor unit 10 is usable with the outlet adapter 20. With the outlet adapter 20 inserted into a wall outlet at the installation location (e.g., in a room) in the state shown in FIG. 9, the environmental sensor unit 10 can be powered in a stable manner and also can be fixed at the installation location in a stable manner.

This type of environmental sensor unit 10 is also designed to be installed at a location exposed to the environment in which environmental information is continuously obtained. However, the environmental sensor unit 10 may be moved together with the outlet adapter 20 to a location near a different outlet by a deceptive third party. Further, the environmental sensor unit 10 and the outlet adapter 20 fixed to a power strip may be moved together with the power strip by a careless third party.

In this case, environmental data during or after such moving can be the data unintended by the user, which can cause wasted time and energy or wrong conclusions based on erroneous measurement results. The control procedures shown in the first to third embodiments for the environmental sensor unit 10 reduce wasted time and energy resulting from the environmental sensor unit 10 continuously obtaining data unintended by the user and reduce wrong conclusions based on erroneous measurement results, without using other terminals and/or adding other mechanical components to the sensor unit. After user recognition is achieved, no abnormality processing is performed. This structure can meet a user request for intentionally moving the environmental sensor unit 10 and using the sensor unit at a different location.

Other Modifications

The above embodiments have been described by way of example only, and the present invention is not limited to the specific embodiments described above. Various modifications may be made to the present invention within the scope of its technical idea. For example, to determine moving of the environmental sensor unit 1 or 10, acceleration data is detected by the acceleration sensor 4e in the environmental sensor unit 1 or 10 to represent a change in the installation state of the environmental sensor in the above embodiments. However, other data may be used to represent a change in the installation state of the environmental sensor. The moving of the environmental sensor unit 1 or 10 may be determined when, for example, a temperature value detected by the temperature-humidity sensor 4a changes by a value exceeding a predetermined threshold for a predetermined duration. In some embodiments, the moving of the environmental sensor unit 1 or 10 may be determined when the environmental sensor unit 1 or 10 connected to an external power supply is disconnected from the external power supply.

The abnormality processing in the above embodiments includes transmitting an alert signal to a remote control terminal. The abnormality processing according to one or more embodiments may include other processes. The abnormality processing may include, for example, suspending measurement of environmental information (data collection) or recording a change in the installation state and the corresponding time, together with collected data. In some embodiments, the abnormality processing may include producing an alert sound using a speaker or other components added to the environmental sensor. The abnormality processing may include deleting data stored in the unit when the unit is stolen. The abnormality processing may further include a combination of these processes.

REFERENCE SIGNS LIST 1, 10 environmental sensor unit
2 communication module
3 MCU
4a to 4g sensor
5 flash memory
6 external power supply
7 battery
20 outlet adapter

The invention claimed is:

1. A method for controlling an environmental sensor including one or more sensor elements configured to detect physical quantities associated with a surrounding environment and to be installed at an intended place, the method comprising:
   detecting the physical quantities in a surrounding environment with the one or more sensor elements included in the environmental sensor;
   transmitting at least the physical quantity detected by the one or more sensor element included in the environmental sensor;
   determining that a change in a physical quantity in accordance with a predetermined rule detected by at least one of the one or more sensor elements included in the environmental sensor;
   setting a user recognition flag in response to the determination that the change in physical quantity in accordance with the predetermined rule is caused by a user;
   detecting a change in an installation state of the environmental sensor; and
   performing a predetermined abnormality processing in response to the electric power supply to the environmental sensor being shut and resumed without setting the user recognition flag, wherein
   the predetermined abnormality processing comprises stopping transmission of the physical quantities until a predetermined resume process is performed.

2. A non-transitory computer-readable storage medium storing a program causing a processor in an environmental sensor to perform operations comprising operations included in the method for controlling the environmental sensor according to claim 1.

\* \* \* \* \*